US006529322B1

(12) United States Patent
Jones et al.

(10) Patent No.: US 6,529,322 B1
(45) Date of Patent: Mar. 4, 2003

(54) HIGH CONTRAST FRONT AND REAR VIEWING SURFACES FOR PROJECTION DISPLAYS

(75) Inventors: Michieal L. Jones, Davis, CA (US); Stuart M. Jacobsen, Powder Springs, GA (US); Steven M. Jaffe, Palo Alto, CA (US); Richard K. Ellinger, Los Altos, CA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 09/490,636

(22) Filed: Jan. 24, 2000

Related U.S. Application Data

(60) Provisional application No. 60/117,360, filed on Jan. 27, 1999.

(51) Int. Cl.[7] .................................................. G03B 21/56
(52) U.S. Cl. ...................................................... 359/443
(58) Field of Search ................................. 359/443, 453, 359/460, 449, 456, 457

(56) References Cited

U.S. PATENT DOCUMENTS

| 1,998,054 A | * | 4/1935 | McBurney ................. 359/452 |
| 3,313,337 A |   | 4/1967 | Bernat ........................ 160/24 |
| 3,637,285 A |   | 1/1972 | Stewart ..................... 359/538 |
| 3,759,604 A |   | 9/1973 | Thelen ....................... 359/588 |
| 3,881,800 A | * | 5/1975 | Friesem ..................... 359/443 |
| 4,003,080 A |   | 1/1977 | Maiman et al. ............. 348/196 |
| 4,713,577 A |   | 12/1987 | Gualtieri et al. ............ 313/468 |
| 4,798,994 A |   | 1/1989 | Rijpers et al. ............... 313/478 |
| 5,193,015 A |   | 3/1993 | Shanks ........................ 359/53 |
| 5,416,617 A | * | 5/1995 | Loiseaux et al. ............. 359/51 |
| 5,418,584 A | * | 5/1995 | Larson ....................... 359/459 |
| 5,428,476 A |   | 6/1995 | Jensen et al. ................ 359/457 |
| 5,658,976 A | * | 8/1997 | Carpenter et al. ........... 524/403 |
| 5,715,083 A | * | 2/1998 | Takayama et al. ........... 359/443 |
| 5,864,426 A | * | 1/1999 | Songer ....................... 359/443 |
| 5,942,319 A | * | 8/1999 | Oyama et al. ............... 428/216 |
| 6,204,971 B1 | * | 3/2001 | Morris et al. ............... 359/619 |

OTHER PUBLICATIONS

Jenmar Visual Systems, Sunnyvale, CA; 4 pages; no date, but at least as early as Oct. 15, 1998.
DDS Rear Projection Screens, LORS Reflection Screens, ©1998 Physical Optics Corporation, Torrance, CA; 2 pages.
Schott Total Customer Care, Contrast Enhancement Filters, 1/98; Duryea, PA; 6 pages.

(List continued on next page.)

Primary Examiner—Christopher Mahoney
(74) Attorney, Agent, or Firm—Fliesler Dubb Meyer & Lovejoy LLP

(57) ABSTRACT

A viewing surface capable of high contrast and high resolution comprising one or more materials that preferentially reflect or transmit or scatter monochromatic light at the primary wavelengths necessary to generate the color gamut appropriate for a given display application. A viewing surface capable of high contrast and high resolution comprising one or more materials which can include rare earth ions, etc. and may be combined with absorbing substrates and/or interference filters.

31 Claims, 6 Drawing Sheets

OTHER PUBLICATIONS

Handbook of Optics, vol. 1, Fundamentals, Techniques, and Design; Second Edition; Sponsored by the Optical Society of America; Chapter 42, Optical Properties of Films and Coatings, J.A. Dobrowolski; McGraw–Hill, Inc.; pp. 42.3–42.25; ©1995.

Multilayer Interference Filters with Narrow Stop Bands; Leo Young; Feb. 1967; vol. 6, No. 2; Applied Optics; pp. 297–312.

Effective Refractive Indices of Metal–Dielectric Interference Filters; D.J. Hemingway and P.H. Lissberger; Mar. 1967; vol. 6, No. 3; Applied Optics; pp. 471–476.

The Design and Preparation of Induced Transmission Filters; R.J. Holloway and P.H. Lissberger; Mar. 1969; vol. 8, No. 3; Applied Optics; pp. 653–660.

Theory of Induced–Transmission Filters in Terms of the Concept of Equivalent Layers, B.V. Landau and P.H. Lissberger; Nov. 1972; vol. 62, No. 11; Journal of the Optical Society of America; pp. 1258–1264.

Coatings with Induced Transmission, P.H. Lissberger; Jan. 1, 1981; vol. 20, No. 1; Applied Optics; pp. 95–103.

Interference Filters with Multiple Peaks; E. Pelletier and H.A. Macleod; vol. 72, No. 6, 6/82; ©1982 Optical Society of America.

Da–Lite website downloads as of Oct. 8, 1998.

Stewart Filmscreen Corporation website downloads as of Oct. 8, 1998.

* cited by examiner

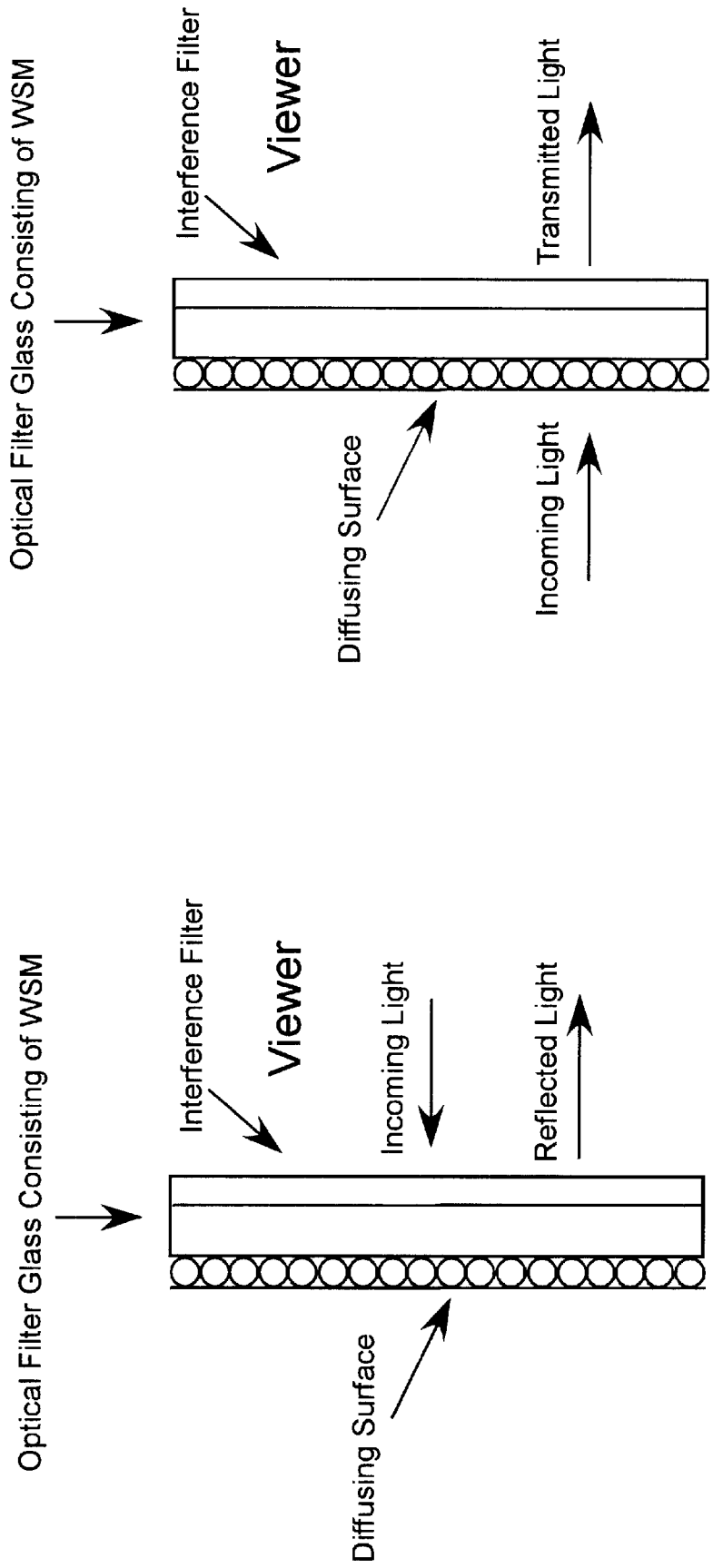

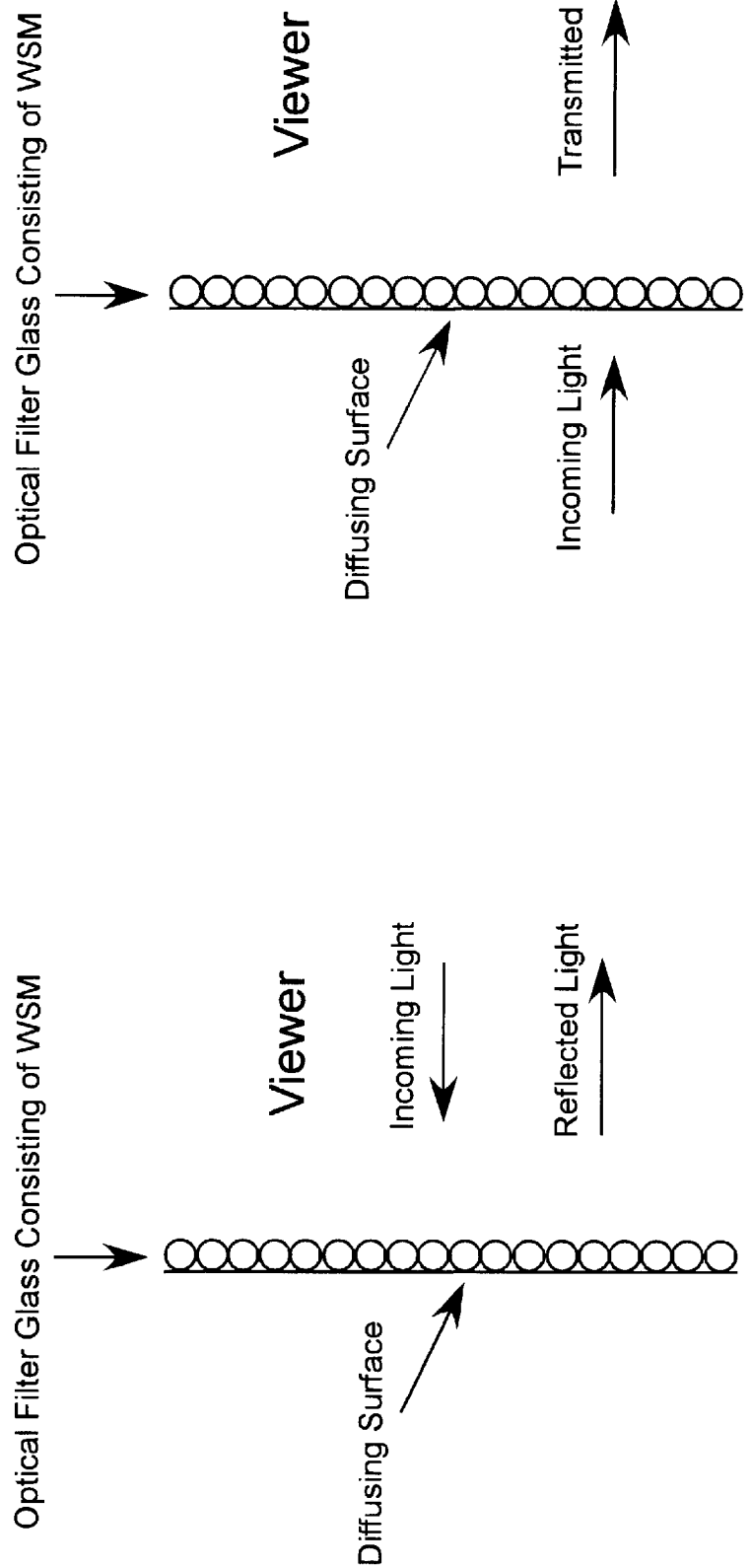

HIGH CONTRAST FRONT AND REAR VIEWING SURFACES FOR PROJECTION DISPLAYS

This application claims priority to an earlier filed provisional patent application, Ser. No. 60/117,360, filed Jan. 27, 1999.

FIELD OF THE INVENTION

BACKGROUND OF THE INVENTION

The contrast in projection displays is limited by the amount of ambient light impinging on the viewing surface. This problem is acute in a front projection display which projects an image onto a conventional diffusing surface. The viewing screen must be highly reflective due to the relatively low light levels generated by common projection technology. In addition, current projection techniques generate non-saturated colors requiring a surface that can reflect across a broad spectral band. As a result, these screens reflect the ambient light equally as well as the projected light from the display. The darkest screen color is white when any appreciable room light is present.

In order to generate high contrast images, the projector must generate sufficiently high light levels so that the viewer can perceive the projected image above the ambient light levels. Most projectors cannot currently meet this requirement. Generating high contrast, sufficiently bright images using front projection techniques has not yet been adequately solved.

The most common solution is to turn the room lights off. However, this solution is usually not acceptable in, for example, educational and training meetings. Several methods have been developed to solve this contrast problem. One method employs a rear projection screen. Several designs exist which enable the viewing screen to function as an optical diode. In this case, the projected image is transmitted through the viewing surface while the ambient light is absorbed by the screen or transmitted through the screen. These devices greatly improve the contrast and remain the preferred embodiment for projection displays.

This optical diode effect is the basis of the standard screens used in rear projection televisions. These screens employ a lenticular lens element located directly behind a mask of horizontal black stripes. The absorbing regions are separated only by a small gap. The lenticular lens focuses the projected image generated from behind the screen through the gaps towards the viewer. However, the ambient light impinging from the front is absorbed by the black stripes. The small fraction of ambient light transmitted through the gaps is absorbed by the blackened walls of the projector's cabinet.

The common optical diode screens have several limitations. The obtainable contrast is still below the level that is required, particularly in high ambient light conditions as in an office environment. In addition, most diodes employ fixed structures and optics as discussed above. These surfaces lead to moire patterns and limit the obtainable resolution. No spatial frequencies can be displayed which have a higher frequency than the periodic pattern of the structure.

SUMMARY OF THE INVENTION

One approach to improve contrast and resolution is to take advantage of the light emission characteristics offered by the new projection techniques based on lasers or resonant microcavities. The latter is described in U.S. Pat. No. 5,469,018. These light sources generate narrow band emission, resulting in highly saturated primary colors. In contrast, common light valves and projection CRTs generally produce non-monochromatic light. Any spectral filtering employed to increase saturation limits the brightness and lowers the contrast.

Viewing screens can be fabricated to generate high contrast images when the image sources emit monochromatic light. In a front viewing screen application, such surfaces can be made to preferentially reflect the projected light while absorbing the ambient light. In a rear viewing screen application, such surfaces can be made to transmit the projected image while absorbing the ambient light.

Accordingly, the invention includes a viewing surface capable of high contrast and high resolution comprising one or more materials that preferentially reflect or transmit or scatter monochromatic light at the primary wavelengths necessary to generate the color gamut appropriate for a given display application.

Further, the invention includes a viewing surface capable of high contrast and high resolution comprising one or more materials which can include rare earth ions, etc. and may be combined with absorbing substrates and/or interference filters.

Other objects and advantages of the present invention will become apparent to those skilled in the art from the following detailed description of the preferred embodiments, when read in light of the accompanying drawings.

BRIEF DESCRIPTION OF THE FIGURES

FIG. 5 is an embodiment of the invention of a front projection diffusing surface laminated to optical filter glass consisting of wavelength selective material and interference coating.

FIG. 6 is an embodiment of the invention of a rear projection diffusing surface laminated to optical filter glass consisting of wavelength selective material and interference coating.

FIG. 7 is an embodiment of the invention of a front projection diffusing surface fabricated from wavelength selective scattering elements.

FIG. 8 is an embodiment of the invention of a rear projection diffusing surface fabricated from wavelength selective scattering elements.

DETAILED DESCRIPTION OF THE PREFERRED EMBODIMENT

A diffuse viewing surface typically involves an array of small features or elements designed to distribute the projected light into a specific angular range. This surface may be attached to a rigid or flexible substrate. The resultant light distribution is governed by the refractive indices of the materials involved along with the form and size of the elements. Scattering, refraction, diffraction and reflection may all be utilized to generate the desired light distribution. The elements may be randomly placed or may form lenticular or fresnel optical structures. Parameters of the screen are optimized so that the resulting light distribution is appropriate for the viewing area. The feature density and size also determines the obtainable spatial resolution. High definition images require relatively fine features in order to adequately display the image.

Figure 2:
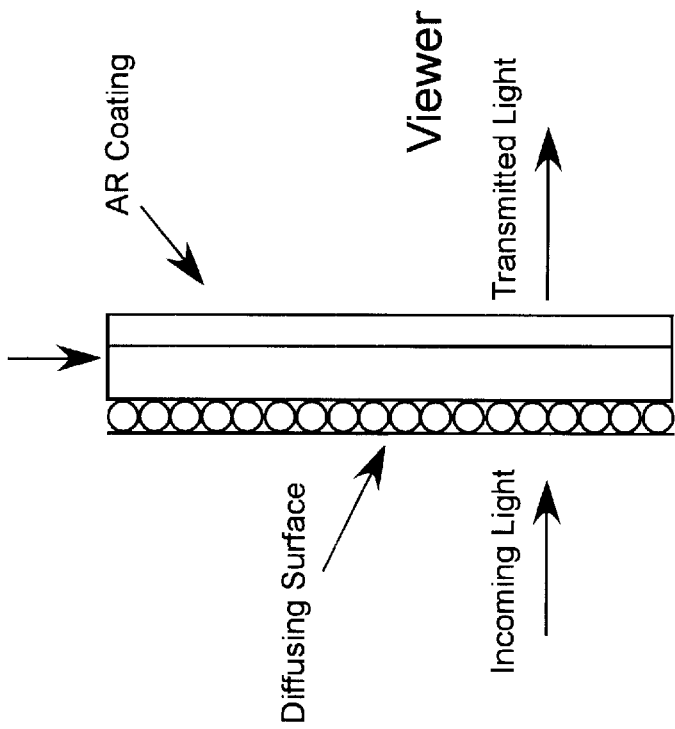
FIG. 2 is an embodiment of the invention of a rear projection diffusing surface laminated to AR coated wavelength selective optical filter glass consisting of wavelength selective material (WSM).
Figure 1:
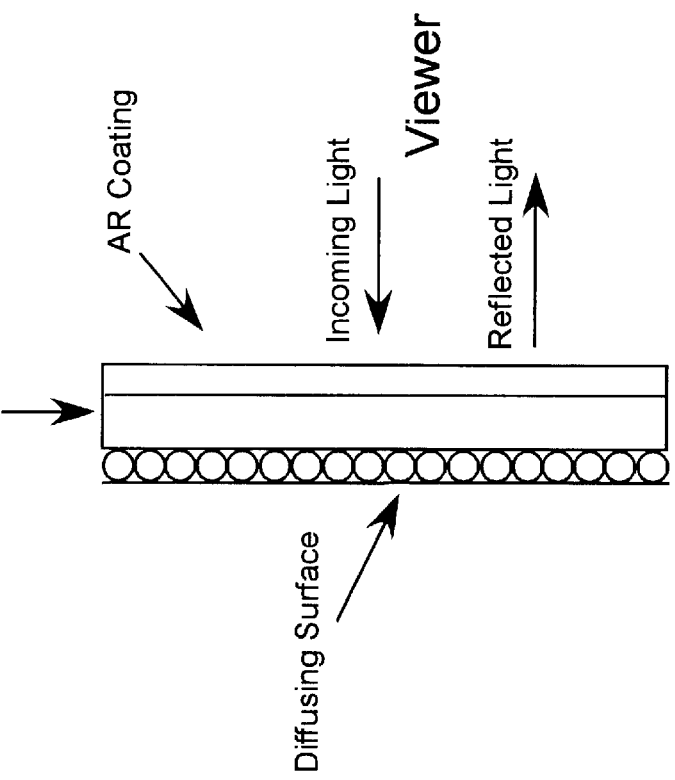
FIG. 1 is an embodiment of the invention of a front projection diffusing surface laminated to AR coated wavelength selective optical filter glass consisting of wavelength selective material (WSM).

In the preferred embodiment of the invention, a suitable wavelength selective optical filter consisting of a wavelength selected material (WSM) is attached to the viewing side of a diffuse viewing surface. As illustrated in FIGS. 1 and 2, the screen may be used for either front or rear projection. The optical filter is designed to substantially transmit the three primary colors generated by a projector utilizing resonant microcavities, lasers or other narrow band sources of light while substantially blocking any broadband ambient light.

Figure 11:
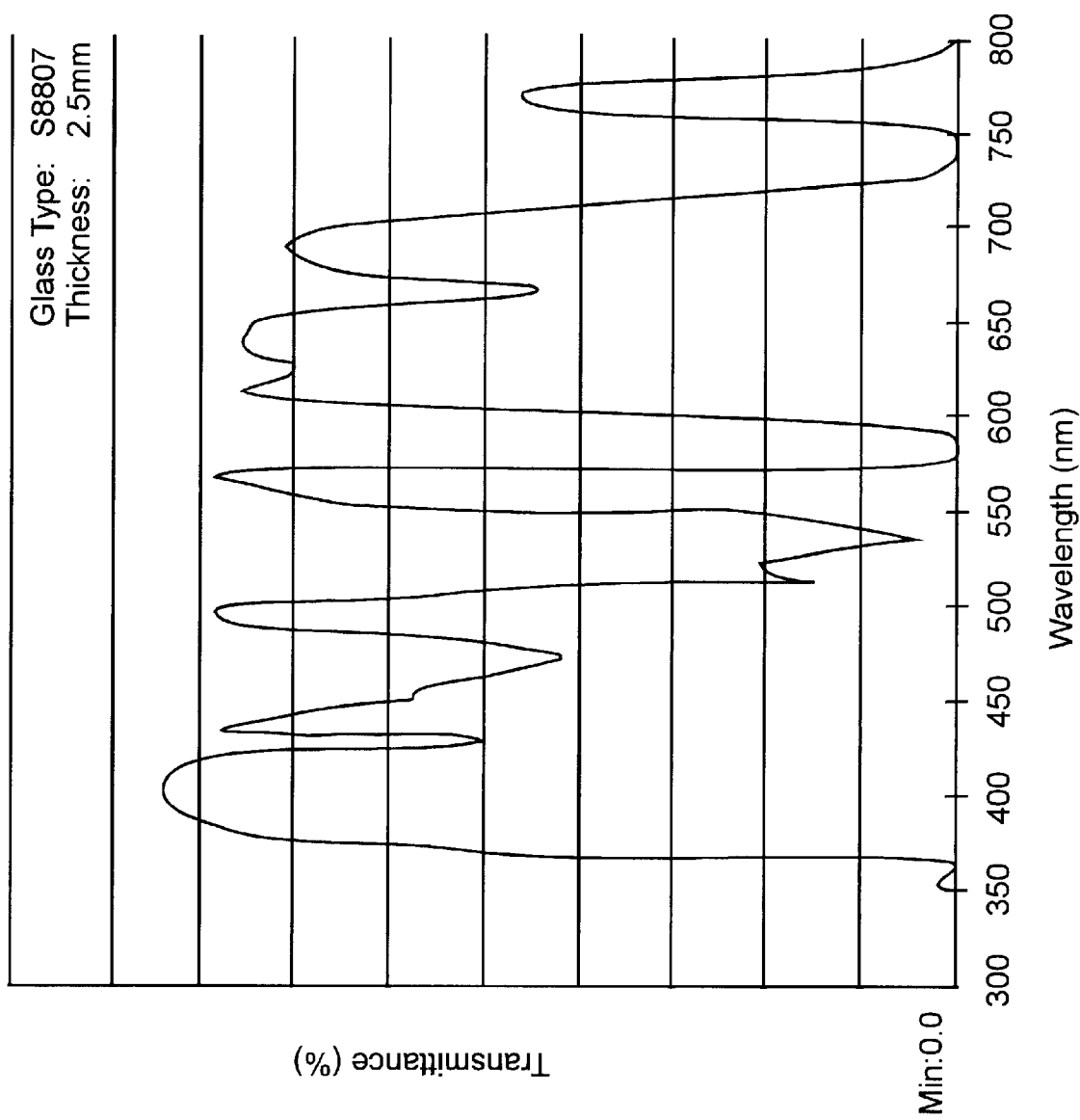
FIG. 11 is a spectral transmittance of a commercially available contrast enhancement filter.

One optical filter material suitable for this application is Schott glass filter S-8807. Its transmittance spectrum is provided in FIG. 11. The spectrum contains highly transmitting regions located around the primary colors: red (625 nm), green (550 nm) and blue (475 nm). The majority of the remaining visible spectral regions are absorbed. Similar Schott glass filters such as S8806A and S8801 may also be utilized. Filters using other wavelength selective materials may also be used. Materials containing rare earth ions represent an excellent choice due to their narrow absorption features. Other potential materials may utilize transition metal ions or organic dyes to generate narrow absorption features.

The front of the wavelength selective optical filter may be anti-reflection coated to further enhance image contrast. Any of the several methods commercially utilized for anti-reflection coating display glass may be used. These methods include but are not limited to the application of a thin film layer, or layers, of refractive index intermediate between the index of air and the index of the optical filter (see J. A. Dobrowolski, *Optical Properties of films and Coatings*, in *Handbook of Optics Vol. I, Fundamentals, Techniques, and Design*, McGraw-Hill, Inc., 1995; which is incorporated herein by reference) and the roughening of the front reflecting surface.

Figure 4:
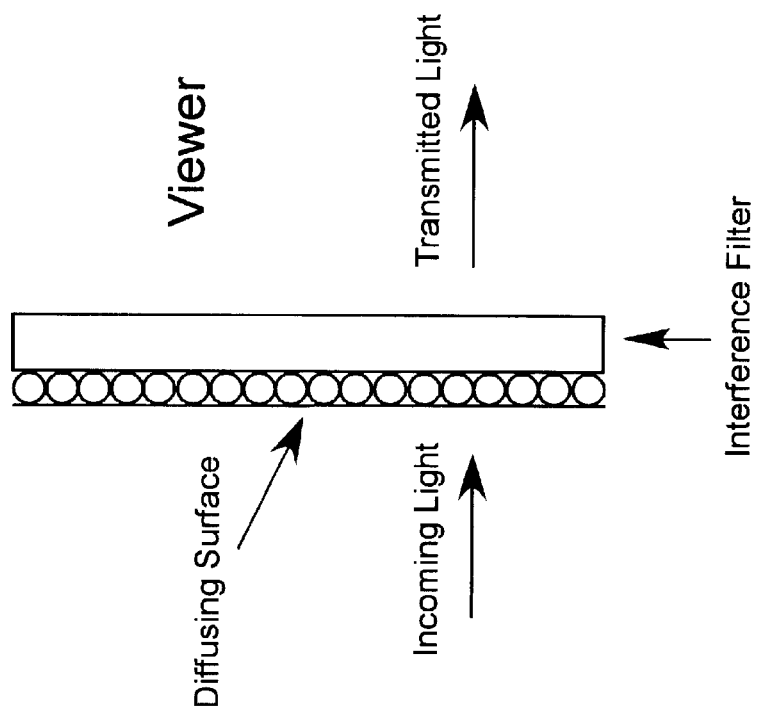
FIG. 4 is an embodiment of the invention of a rear projection diffusing surface laminated to an interference filter.
Figure 3:
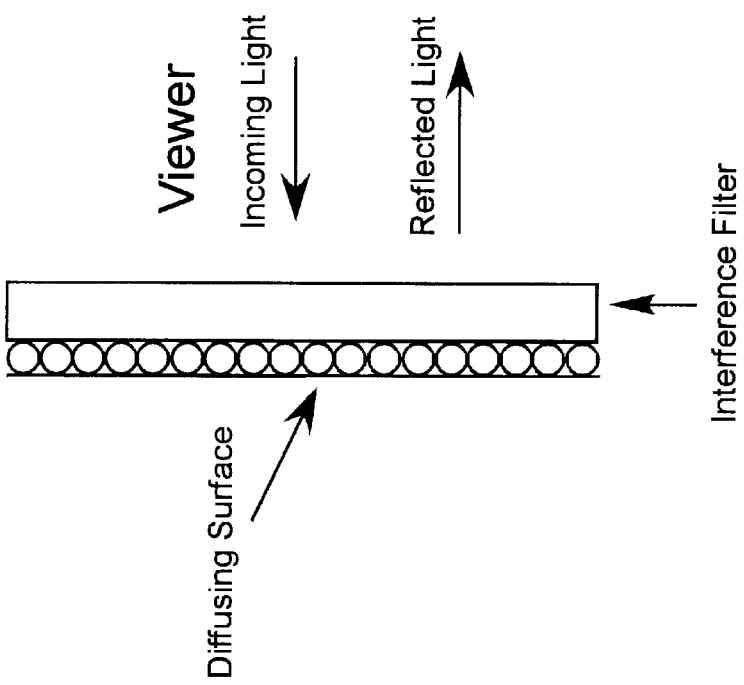
FIG. 3 is an embodiment of the invention of a front projection diffusing surface laminated to an interference filter.

Another wavelength selective optical filter that preferentially transmits monochromatic light is an interference filter. Embodiments utilizing interference filters are illustrated in FIGS. 3 and 4. It is possible to design a filter or collection of filters that reflect or transmit multiple wavelengths such as the three primary colors produced by the projector (examples of such filters can be found in: J. A. Dobrowolski, *Optical Properties of Films and Coatings*, in *Handbook of Optics Vol. I, Fundamentals, Techniques, and Design*, McGraw-Hill, Inc., 1995; E. Pelletier and H. A. Macleod, *Interference Filters with Multiple Peaks*, vol. 72, no. 6, J.Opt.Soc.Am/, June 1982; L. Young, *Multilayer Interference Filters with Narrow Stop Bands*, vol. 6, no. 2, Applied Optics, February 1967; U.S. Pat. No. 3,759,604; all of which are incorporated herein by reference). These filters may be combined with a diffuse viewing surface to obtain the appropriate light distribution. Diffuse viewing surfaces can include typical and existing rear and front projection screens. One method for generating absorption of undesired wavelengths may be the use of an induced transmission filter or filters (see P. H. Lissberger, *Coatings with Induced Transmission*, vol. 20, no. 1, Applied Optics, Jan. 1, 1981, which is incorporated herein by reference) tuned to pass the primary colors. A suitable wavelength selective optical filter may also be constructed as a combination of an interference filter and wavelength selective material as illustrated in FIGS. 5 and 6. Interference filters are typically both wavelength and angle specific. Filters suitable for this application will need to be designed to function properly over the range of angles required for viewing.

In another embodiment, the high contrast screen can be made by employing individual elements which inherently scatter, reflect, diffract, refract or transmit only the narrow wavelength regions corresponding to the three primary display colors as illustrated in FIGS. 7 and 8. The elements may be randomly placed or may form lenticular or fresnel optical structures. These elements when combined form a diffuse viewing surface that distributes light that matches the desired wavelengths such as the light generated by a resonant microcavity projection display or a laser projection display. Ambient light would be preferentially absorbed since this light is typically composed of a broad distribution of wavelengths. The individual elements may be constructed from wavelength selective materials or wavelength selective structures employing interference or diffraction. The individual elements may involve the Schott filter glasses or interference filters described above.

Figure 10:
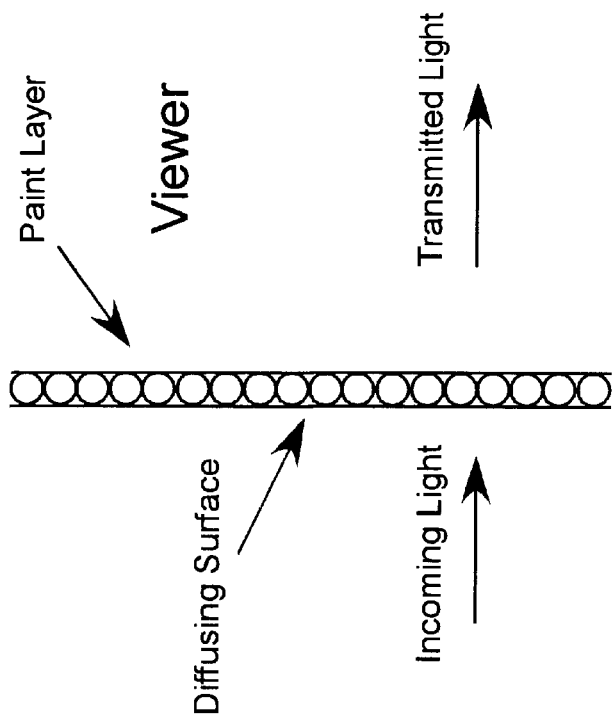
FIG. 10 is an embodiment of the invention of a rear projection diffusing surface overcoated with wavelength selective paint.
Figure 9:
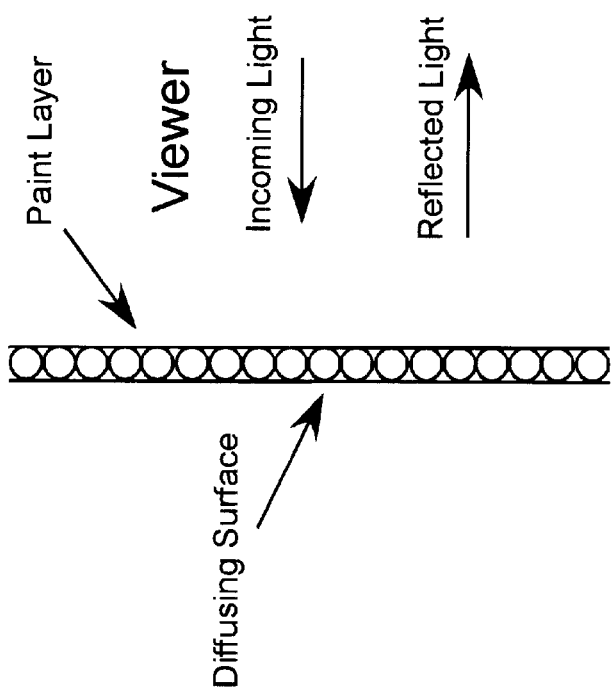
FIG. 9 is an embodiment of the invention of a front projection diffusing surface overcoated with wavelength selective paint.

In another embodiment, the wavelength selective material or filter may be applied to the scattering surface as a thin paint or powder layer rather than as a freestanding structure as shown in FIGS. 9 and 10. For this embodiment, such WSM material can be ground up and included in an emulsion and then applied to a surface.

A viewing surface based upon individual wavelength selective elements can be made using standard techniques employed to fabricate current screens. The size and form of the elements would be selected to generate the correct angular distribution while maintaining sufficient spatial resolution.

INDUSTRIAL APPLICABILITY

High contrast viewing screens capable of high resolution are possible when combined with a projection display that generates nearly monochromatic light. These viewing surfaces will be used in front and rear projection systems. Such applications include television, home theatres and conference rooms.

Other features, aspects and objects of the invention can be obtained from a review of the figures.

It is to be understood that other embodiments of the invention can be developed and fall within the spirit and scope of the invention.

We claim:

1. A viewing screen comprising:

a passive screen;

said screen absorbing ambient light; and said screen including a rare earth containing material, the rare earth containing material adapted to preferentially select light in a narrow wavelength region from a substantially monochromatic source.

2. The viewing screen of claim 1 wherein:

said screen is a front viewing screen and said screen preferentially reflects light from a substantially monochromatic source while absorbing ambient light.

3. The viewing screen of claim 1 wherein:

said screen is a rear viewing screen and screen preferentially transmits light from a substantially monochromatic source while absorbing ambient light.

4. The viewing screen of claim 3 wherein:

said screen includes at least three rare earth materials, each of said materials for preferentially transmitting light from a different substantially monochromatic light source.

5. The viewing screen of claim 1 wherein:

said screen includes at least three rare earth containing materials, each of said materials for preferentially scattering light from a different substantially monochromatic light source.

6. The viewing screen of claim 1 wherein:

said screen includes an interference filter.

7. The viewing screen of claim 1 wherein:

said screen is a high contrast and a high resolution screen.

8. The viewing screen of claim 1 wherein:

said screen is a front viewing screen and said screen preferentially scatters light from a substantially monochromatic source while absorbing ambient light.

9. The viewing screen of claim 1 wherein:

said viewing screen is one of rigid and flexible.

10. The viewing screen of claim 1 wherein:

said viewing screen is comprised of a material having one or more desired refractive indices.

11. The viewing screen of claim 1 wherein:

the desired light distribution can be accomplished using at least one of scattering, refraction, diffraction, and reflection.

12. The viewing screen of claim 1 wherein:

said viewing screen can include at least one of randomly placed structures, lenticular structures, and fresnel structures.

13. The viewing screen of claim 1 wherein:

said screen can include materials having selected forms and sizes.

14. The viewing screen of claim 1 wherein:

said rare earth containing material is a wavelength selective optical filter.

15. The viewing screen of claim 1 wherein:

said screen is comprised of a material which at least one of absorbs and blocks out broadband ambient light.

16. The viewing screen of claim 1 wherein:

said screen includes high transmitting regions around the primary colors of red at about 625 nm, green at about 550 nm, and blue at about 475 nm.

17. The viewing screen of claim 1 wherein:

said screen includes an anti-reflective coating.

18. The viewing screen of claim 1 wherein:

said screen includes a diffuse viewing surface.

19. The viewing screen of claim 1 wherein:

said screen is an induced transmission filter tuned to pass at least one color.

20. The screen of claim 1 wherein:

said screen is a wavelength selected material.

21. The screen of claim 1 wherein:

said screen is comprised of a paint.

22. The screen of claim 1 wherein:

said screen is comprised of a powder deposited on a substrate.

23. The screen of claim 1 including:

a first diffusing layer;

a second layer of said rare earth containing material which is a wavelength selective material; and a third anti-reflective layer.

24. The screen of claim 1 including:

a first diffusing layer;

a second layer of said rare earth containing material which is a wavelength selective material layer; and a third interference filter layer.

25. The screen of claim 1 including:

a diffusing layer coated with said rare earth containing material in the form of a wavelength selective paint.

26. A viewing screen comprising:

a passive screen that absorbs ambient radiation; and said screen including a rare earth containing material adapted to preferentially select substantially monochromatic radiation from a substantially monochromatic source.

27. A viewing screen comprising:

a passive screen including a rare earth containing material that preferentially selects substantially monochromatic radiation.

28. The screen of claim 27 wherein:

said screen is comprised of a first rare earth containing material that can select a first primary color of substantially a single first wavelength;

said screen is comprised of a second rare earth containing material that can select a second primary color of substantially a single second wavelength; and said screen is comprised of a third rare earth containing material that can select a third primary color of substantially a single third wavelength.

29. A viewing screen comprising:

a passive screen;

said passive screen absorbing ambient light; and said passive screen including a transition metal containing material adapted to select a primary color of substantially a single wavelength from a substantially monochromatic source.

30. A viewing screen comprising:

a passive screen;

said passive screen absorbing ambient radiation; and said passive screen including a transition metal containing material that can preferentially select radiation of substantially a single wavelength from a substantially monochromatic source.

31. A viewing screen comprising:

a passive screen including a transition metal containing material that can select light of substantially a single wavelength.

* * * * *

UNITED STATES PATENT AND TRADEMARK OFFICE
CERTIFICATE OF CORRECTION

PATENT NO. : 6,529,322 B1  
DATED : March 4, 2003  
INVENTOR(S) : Michieal L. Jones It is certified that error appears in the above-identified patent and that said Letters Patent is hereby corrected as shown below:

<u>Title page,</u>  
Item [73], Assignee, change "University of Georgia Research Foundation, Inc., Athens, GA (US)" to -- Quantum Vision, Inc., Mountain View, CA (US) --.

<u>Column 5,</u>  
Line 11, change "3" to -- 1 --.  
Line 12, change "earth material" to -- earth containing material --.  
Line 13, change "transmitting" to -- scattering --.  
Line 16, change "1" to -- 3 --.  
Line 17, change "rare earth containing" to -- rare earth --.  
Line 18, change "scattering" to -- transmitting --.

Signed and Sealed this

Seventeenth Day of June, 2003

JAMES E. ROGAN  
*Director of the United States Patent and Trademark Office*

UNITED STATES PATENT AND TRADEMARK OFFICE
CERTIFICATE OF CORRECTION

PATENT NO.    : 6,529,322 B1
DATED         : March 4, 2003
INVENTOR(S)   : Michael L. Jones et al.

It is certified that error appears in the above-identified patent and that said Letters Patent is hereby corrected as shown below:

This certificate supersedes Certificate of Correction issued June 7, 2003, the number was erroneously mentioned and should be vacated since Certificate of Correction was not granted.

Signed and Sealed this

Sixteenth Day of December, 2003

JAMES E. ROGAN
*Director of the United States Patent and Trademark Office*